United States Patent
Van Wiemeersch et al.

(10) Patent No.: US 9,940,764 B2
(45) Date of Patent: Apr. 10, 2018

(54) KEY FOB CHALLENGE REQUEST MASKING BASE STATION

(71) Applicant: MYINE ELECTRONICS, INC., Ferndale, MI (US)

(72) Inventors: John Robert Van Wiemeersch, Novi, MI (US); Joey Ray Grover, Madison Heights, MI (US); Scott Smereka, Warren, MI (US); Justin Dickow, Royal Oak, MI (US)

(73) Assignee: Livio, Inc., Royal Oak, MI (US)

( * ) Notice: Subject to any disclaimer, the term of this patent is extended or adjusted under 35 U.S.C. 154(b) by 59 days.

(21) Appl. No.: 15/095,525

(22) Filed: Apr. 11, 2016

(65) Prior Publication Data
US 2017/0294062 A1 Oct. 12, 2017

(51) Int. Cl.
G07C 9/00 (2006.01)
B60R 25/24 (2013.01)

(52) U.S. Cl.
CPC ...... G07C 9/00111 (2013.01); G07C 9/00309 (2013.01); B60R 25/24 (2013.01); G07C 2009/00769 (2013.01); G07C 2009/00984 (2013.01)

(58) Field of Classification Search
CPC .............. G07C 9/00111; G07C 9/0039; G07C 2009/00769; G07C 2009/00984; B60R 25/24
USPC .................................................. 340/5.61, 5.2
See application file for complete search history.

(56) References Cited

U.S. PATENT DOCUMENTS

| 6,853,853 B1* | 2/2005 | Van Wiemeersch .... B60R 25/04 340/5.2 |
| 2009/0206989 A1 | 8/2009 | Leitch |
| 2010/0282639 A1 | 11/2010 | Lang et al. |
| 2013/0082820 A1* | 4/2013 | Tieman .............. G07C 9/00309 340/5.61 |
| 2014/0247112 A1 | 9/2014 | Bassali |

(Continued)

FOREIGN PATENT DOCUMENTS

WO 2015084852 A1 6/2015

OTHER PUBLICATIONS

In Compliance Magazine. (No Date). "RKE Key Fob Pouches Protect Remote Keyless Entry Keyfobs From Activation." Retrieved from http://incompliancemag.com/rke-key-fob-pouches-protect-remote-keyless-entry-keyfobs-from-activation/ on Jan. 12, 2016.

(Continued)

*Primary Examiner* — Ali Neyzari
(74) *Attorney, Agent, or Firm* — Jennifer M. Stec; Brooks Kushman P.C.

(57) ABSTRACT

A base station may include a transceiver, an indicator, and a processor programmed to detect presence of a key fob using one or more inputs. When the key fob is detected, the processor may direct the transceiver to broadcast an interference signal using the transceiver to prevent the key fob from detecting and responding to challenge requests and set the indicator to indicate presence of the broadcast. When an access request is received from a modem, using the transceiver the base station may temporarily discontinue broadcast of an interference signal to send a challenge request to the key fob and receive a challenge response, and send a response to the access request including information based on the challenge response.

23 Claims, 4 Drawing Sheets

(56) References Cited

U.S. PATENT DOCUMENTS

| | | |
|---|---|---|
| 2015/0193996 A1 | 7/2015 | Van Wiemeersch et al. |
| 2015/0270738 A1* | 9/2015 | Colja .................... H02J 7/025 |
| | | 307/104 |
| 2016/0049033 A1 | 2/2016 | Sigal et al. |
| 2017/0166163 A1* | 6/2017 | Poma .................... B60R 25/24 |

OTHER PUBLICATIONS

"Car Remote Control Jammers for sale, strong remote control blockers." Retrieved from http://www.jammer-store.com/remote-control-jammers-blockers.html on Jan. 12, 2016.

* cited by examiner

KEY FOB CHALLENGE REQUEST MASKING BASE STATION

TECHNICAL FIELD

Aspects of the disclosure generally relate to a base station for masking low-frequency (LF) key fob challenge requests.

BACKGROUND

Passive entry systems are used to enable a user to remotely access or perform some operation to a vehicle. For example, a vehicle may be equipped with a remote entry system that includes a controller located on the vehicle, which wirelessly communicates with an electronic smart key possessing the ability to transmit and receive information on different frequencies or in a full-duplex or half-duplex mode using the same frequency. Such a 2-way capable device may be referred to as "key fob." The key fob may include controls that allow the user to request access to the vehicle or start the engine. In some applications, a user may engage a door handle of the vehicle, triggering the vehicle controller to transmit a challenge signal to the key fob for authentication. In response, the key fob generates a response signal and transmits the response to be received by the controller. Upon receiving the signal, the controller performs the requested action, such as unlocking the vehicle doors. A challenge-response authentication process using the key fob may also apply to starting a vehicle engine.

SUMMARY

In a first illustrative embodiment, a system includes a base station, including a transceiver, an indicator, and a processor, programmed to detect presence of a key fob using one or more inputs, and when the key fob is detected, broadcast an interference signal using the transceiver to prevent the key fob from hearing or responding to challenge requests and set the indicator to indicate presence of the broadcast of the interference signal.

In a second illustrative embodiment, a method includes detecting presence of a key fob; when the key fob is detected, broadcasting an interference signal using a transceiver to prevent the key fob from responding to challenge requests and displaying an indicator to indicate presence of the broadcast; and when the key fob is no longer detected, discontinuing the broadcast of the interference signal and resetting the indicator to no longer display presence of the broadcast.

In a third illustrative embodiment, a system includes a transceiver for communication with a key fob; a modem; and a processor, in communication with the transceiver and modem, programmed to receive a request to access the key fob from the modem, using the transceiver, temporarily discontinue broadcast of an interference signal to send a challenge request to the key fob and receive a challenge response, and send a response to the request including information based on the challenge response.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
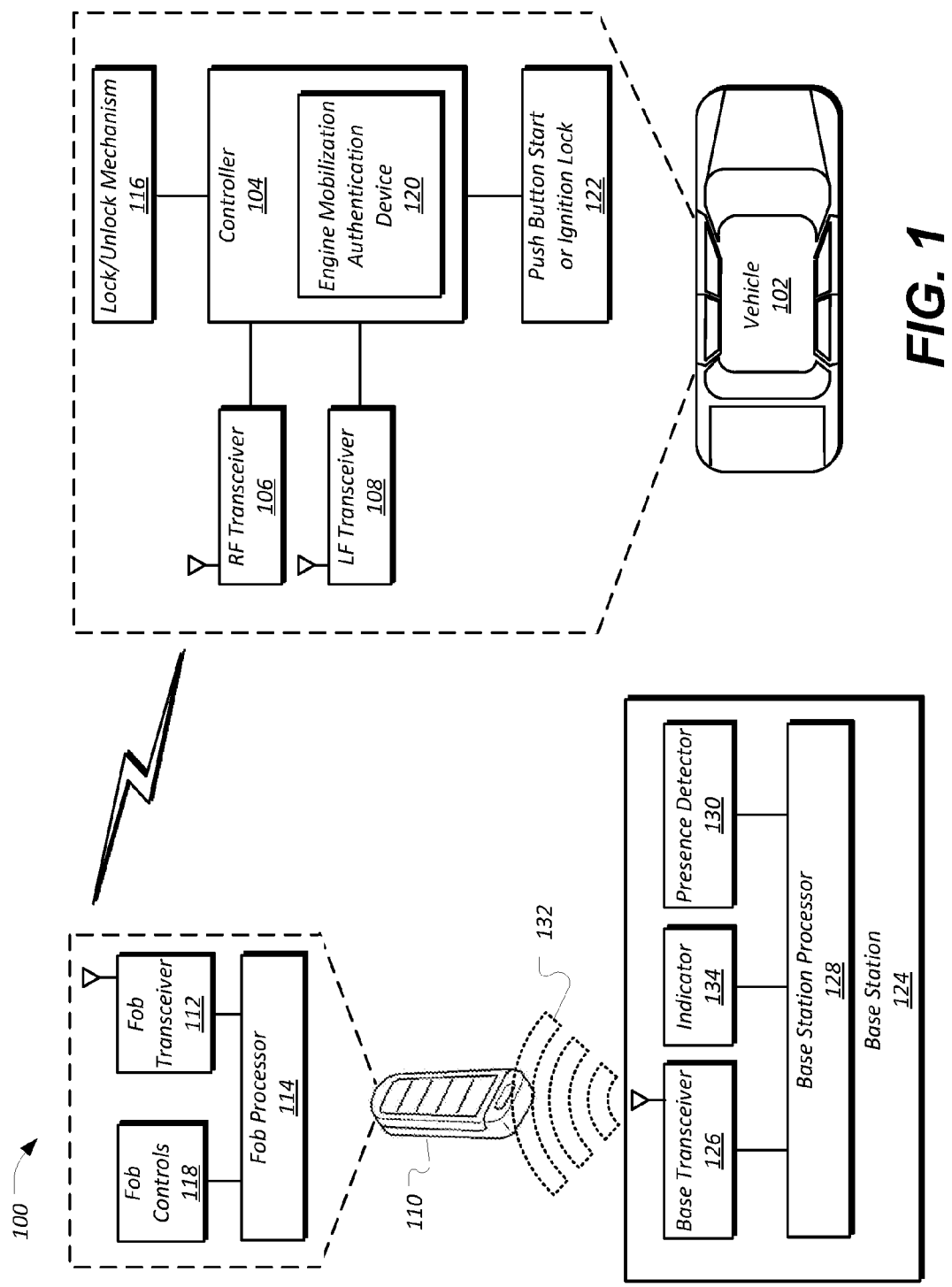
FIG. 1 illustrates an example system having a base station for securing a key fob of a keyless entry vehicle.

FIG. 1 illustrates an example system 100 having a base station 124 for securing a key fob 110 of a keyless entry vehicle 102. A keyless entry vehicle 102 may include a vehicle supporting features such as Remote Start, Remote Entry, Passive Entry, or Passive Start. The vehicle 102 includes a controller 104 having a radio frequency (RF) receiver or transceiver 106 for wireless communication with an RF fob transceiver 112 of the key fob 110. The vehicle 102 also includes a Low Frequency (LF) transmitter or transceiver 108 and antenna system. Challenges to the fob 110 from the vehicle 102 may be in the form of LF or RF and the response may be LF or RF. The key fob 110 includes one or more fob controls 118 for commanding a fob processor 114 to use the fob transceiver 112 to control the vehicle 102 over RF. The controller 104 may be in communication with a lock/unlock mechanism 116 to allow the controller 104 to perform unlocking or locking doors of the vehicle 102. The controller 104 may also be in communication with an engine mobilization authentication device 120 to enable engine starting based on authentication of the key fob 110, a key, or another user authentication device. When the key fob 110 is placed at a base station 124, the base station 124 may utilize a base transceiver 126 to block the vehicle challenge signal from being heard by the key fob 110 or the base transceiver 126 may wirelessly instruct the key fob 110 not to interact over RF with the controller 104 of the vehicle 102. The system 100 may take many different forms and may include multiple and/or alternate components and facilities. While an example system 100 is shown in FIG. 1, the components illustrated in system 100 are not intended to be limiting. Indeed, additional or alternative components and/or implements may be used.

In a passive entry passive start (PEPS) implementation, a user carrying the key fob 110 is allowed "keyless" and/or passive entry and start of the vehicle 102. The key fob 110 may include fob controls 118 such as lock, unlock, remote start, and trunk release buttons. To initiate an unlock, or other command sequence, the user may touch or move into proximity to a sensor of the vehicle 102 or press one of the fob controls 118. Responsive to the initiation, the controller 104 may send a low-frequency (LF) challenge message to the key fob 110 (e.g., over 125 kHz) using the LF transceiver 108, and listen for an ultra-high-frequency (UHF) response from the key fob 110 including an identification code (e.g., 315 MHz or 902 MHz in North America). Upon receipt of the correct identification code, the controller 104 may perform the initiated command. For instance, the controller 104 may direct the lock/unlock mechanism 116 to unlock the vehicle 102 doors in response to the user pressing the unlock fob control 118. The key fob 110 may also be used by the engine mobilization authentication device 120 to authenticate the user via RF encrypted data transmitted by the fob to allow the user to start the vehicle 102 by pressing a start button.

In a passive anti-theft system (PATS) implementation, a key or bladed key fob 110 may receive LF challenges and send LF responses over a short distance in order to mobilize the vehicle 102. However, the blade for the key or key fob 110 would need to be inserted into the ignition lock in order to activate the engine mobilization authentication device 120 to authenticate the user to start the vehicle 102. The key may also include an embedded RF transmitter to authenticate the key with the vehicle 102, e.g., when the key is inserted into an ignition lock 122 or a push button start 122 is selected. In such a case, the RF transmitter of the key may transmit RF signals to the controller 104 or engine mobilization authentication device 120 to authenticate the user. Once authenticated, the engine mobilization authentication device 120 may allow the vehicle 102 to be started.

In some cases, unauthorized users may attempt to access a keyless entry vehicle 102. For example, an attacker may place a LF amplifier device near the vehicle 102 to increase the range with which the LF challenge can be provided from the LF transceiver 108 of the vehicle 102 to the key fob 110. In some examples the attacker may also place an UHF amplifier or repeater near the key fob 110. Using these amplification devices, a key fob 110 that is stored indoors or away from the vehicle 102 may be made to respond to the typically short-distance LF challenge. In an attempt to prevent such attacks, it is known that a user may place his or her key fob 110 in a refrigerator or other shielded location. However, such approaches may be inconvenient or ineffective.

The base station 124 may be installed to a user site, such as a home or business, to provide a secure location for the key fob 110 when not in use. The base station 124 may include a base transceiver 126 for wireless communication with the LF transceiver 108 and/or RF fob transceiver 112 of the key fob 110. The base station 124 may include a base station processor 128 configured to detect the presence of the key fob 110. For example, the base station processor 128 may utilize the base transceiver 126 to monitor for communications from a local key fob 110. As one possibility, the base station processor 128 may direct the base transceiver 126 to periodically transmit a dummy LF challenge request, such that if the base transceiver 126 receives a UHF response message, the base station processor 128 may receive the UHF response message and determine presence of the key fob 110.

Additionally or alternately, the base station processor 128 may detect presence of the key fob 110 using inputs from one or more other presence detectors 130. In an example, the presence detector 130 may be a weight sensor configured to provide input to the base station processor 128 indicative of a measure of weight of placed on the base station 124. In such an example, the base station processor 128 may detect presence of the key fob 110 responsive to input indicative of an increase in weight placed on the base station 124.

In another example the presence detector 130 may be an induction coil included in the base station 124 configured to provide input to the base station processor 128 indicative of a measure of electromagnetic flux in the vicinity of the base station 124. In such an example, the base station processor 128 may detect presence of the key fob 110 responsive to input indicative of a change in electromagnetic properties.

The induction coil may further be used, in an example, to inductively charge the key fob 110 when the key fob 110 is detected. Further, other presence detectors 130 or triggers used to detect the presence of a potential key fob 110 may include a capacitive sensor, an optical sensor, a near field communication (NFC) tag, a camera, or other suitable methods.

When the base station processor 128 detects the presence of the key fob 110 at the base station 124, the base station processor 128 may utilize the base transceiver 126 to broadcast a low-level LF interference signal 132. The interference signal 132 may be a duplicate signal at the same frequency and bit rate used by the vehicle 102 to communicate with the key fob 110. For example, if the vehicle challenges the key fob 110 at 125 kHz with an Amplitude Key Shift (ASK) signal containing the proper authorization message, then if the base station 124 generates its own 125 kHz ASK signal with simple alternating bits or all one bits, this signal would destructively interfere and deafen the key fob 110 from hearing a vehicle challenge. This jamming signal could also be a noise signal, such as white noise or pink noise using the same 125 kHz ASK format. Provided the LF signal is not a valid PEPS message, the key fob 110 front-end LF chip will not wake the key fob 110 main microprocessor and therefore the presence of this interference signal would not tax or drain the key fob 110 battery. PEPS based key fobs 110 already have an LF receiver that is active essentially 100% of the time. Therefore, rejecting invalid LF noise would not result in an increased battery consumption concern.

The interference signal 132 may be designed to be strong enough to prevent the key fob 110 from correctly receiving LF challenge requests from the vehicle 102 or from a LF amplifier device, but weak enough not to cause undesirable interference. For example, an interference signal of less than 5 Watt would be sufficient to prevent the key fob 110 from hearing a distant LF challenge. It is known from industry field issues with the Qi Wireless Charging protocol, that a 5 Watt 125 kHz LF signal generated right next to the key fob 110 would prevent the key fob 110 from hearing 30 Watt LF challenges from the vehicle 102 LF antennas even for an antenna only approximately 0.3 meters (one foot) away from the key fob 110. It should be noted that if the key fob 110 does possess Qi for the purpose of wireless re-charging the fob 110, then the act of charging the fob 110 would also generate the jamming signal. The interference signal 132 may accordingly block the key fob 110 from hearing LF challenges and therefore from sending UHF responses, thereby thwarting LF challenge amplifier attacks. The main benefit of this jamming approach by the base station 124 is that it allows the system to be compatible with key fobs 110 already in the market. At present, most of the industry uses LF challenge frequencies of either 134.5 kHz or 125 kHz resulting in the fob LF challenge frequencies being essentially standardized. However, the base station 124 may be configured to be operably configured to either recognize or be instructed which LF jamming frequency to use for a particular car model, fob model or OEM brand of key fobs 110 which do not implement a function to turn off key fob 110 challenge-response capabilities.

Future versions of OEM key fobs 110 may be designed to accept a wireless communication signal to suspend PEPS functions. For such addressable fobs 110, the base station 124 may instruct the key fob 110 to not provide an UHF response to any LF challenge when the key fob 110 has been determined to be on the base station 124. Provided this wireless communication is UHF, BLUETOOTH or some other long range method, the key fob 110 could be instructed by base station 124 to return to normal mode after removed from the base station 124 surface by a quick UHF or BLUETOOTH signal since the range would be adequate. In the case of NFC being used as the addressing technology, the fob 110 could return to normal mode by detecting the absence of a NFC tag.

When the key fob 110 is detected, the base station 124 may be configured to perform one or more other actions as well. In an example, the base station 124 may activate one or more indicators 134 to inform the user that the interference signal 132 has been activated. In an example, the indicators 134 may include a light indicator 134. When the interference signal 132 is activated, the base station processor 128 may direct the light indicator 134 to be adjusted in brightness (e.g., off to on, dim to bright, etc.) and/or color (red to green, green to amber, etc.) to indicate to the user that the key fob 110 is being secured. In another example, the indicators 134 may include a speaker indicator 134. When the interference signal 132 is activated (and/or when deactivated), the base station processor 128 may direct the speaker indicator 134 to play back a chime or other sound. In another example, the base station processor 128 may direct the speaker indicator 134 to play sound, such as white noise, throughout the time that the interference signal 132 is activated. As yet a further possibility, the base station 124 may include a display screen driven by the base station processor 128 to provide information to the user, where the activation state of the interference signal 132 may be one of the elements of information provided by the base station processor 128 to the display screen. As yet another possibility, there may be duplicate indicators 134 that may show when 125 kHz and/or 134.5 kHz jamming is active or it may use an organic light-emitting diode (OLED) or liquid crystal display (LCD) to show the OEM brand or key fob 110 model being jammed. The base station 124 may be designed to be able to transmit two different LF frequencies at the same time to allow multiple key fobs 110 to be placed in a group on a common base station 124 pad.

Figure 2:
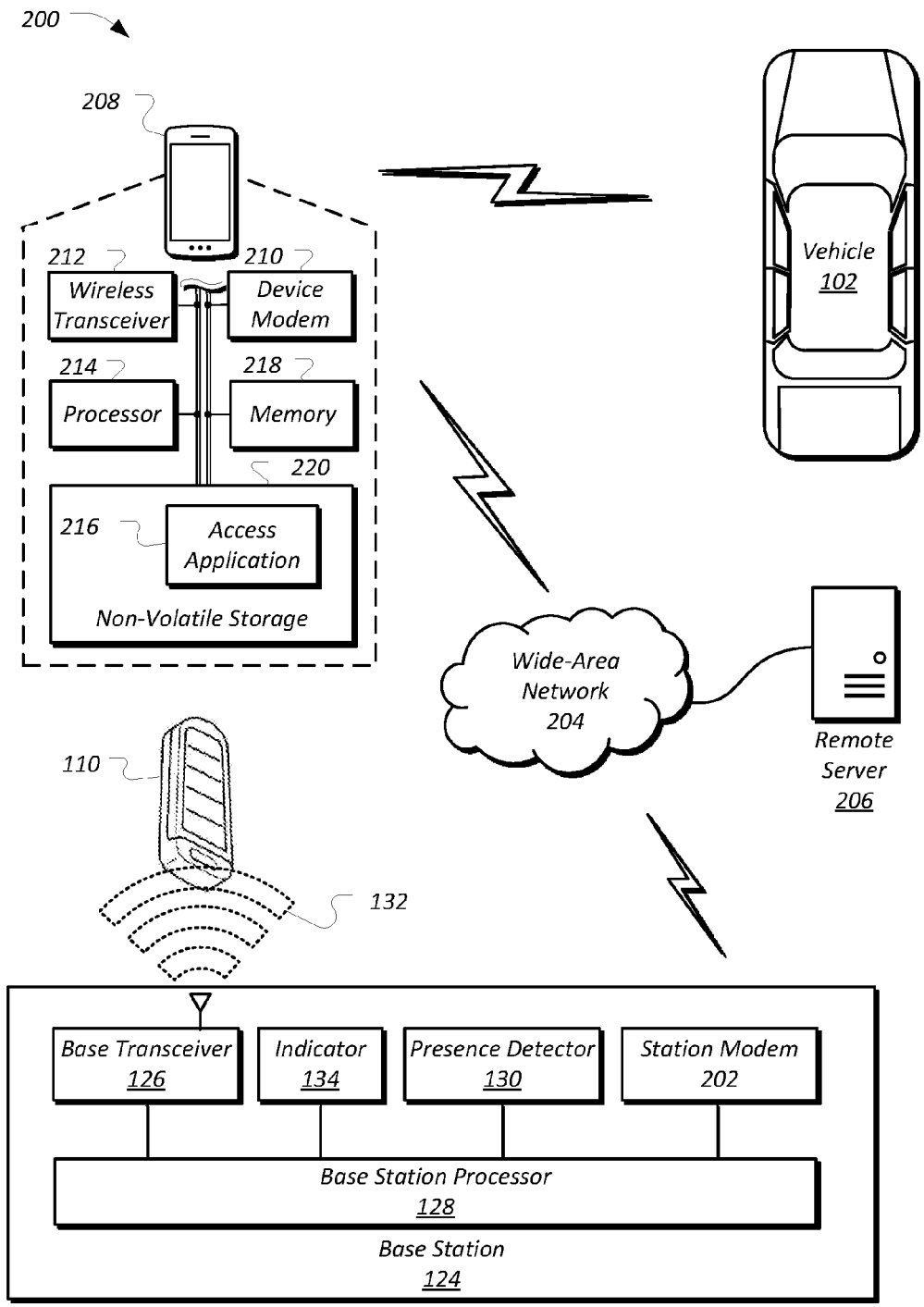
FIG. 2 illustrates an example system including a base station having network connectivity configured to provide key fob authentication features to a user's mobile device.

FIG. 2 illustrates an example system 200 including a base station 124 having network connectivity configured to duplicate and provide key fob 110 authentication features to a user's phone or other mobile device 208. Such a system 200 allows electronic key-sharing between a traditional key fob 110 and a mobile device 208 provided the traditional key fob 110 remains on the base station 124. For instance, to request access to the vehicle 102, the user may utilize the mobile device 208 to access the base station 124 over a wide-area network 204 to receive access credential information from the key fob 110. While an example system 200 is shown in FIG. 2, the components illustrated in system 200 are not intended to be limiting. Indeed, additional or alternative components and/or implements may be used. For example, a single key fob 110 could be mapped one-to-one with a single mobile device 208 or the single key fob 110 could be used as the authorization to a group of mobile devices 208 to become Phone-as-a-Key.

More specifically, the base station 124 may include a station modem 202 through which the base station 124 may communicate over a wide-area network 204. The wide-area network 204 may provide communications services, such as packet-switched network services (e.g., Internet access, VoIP communication services), to devices connected to the wide-area network 204. An example of a wide-area network 204 may include, as some examples, a cellular telephone network, a cable Internet network, a modem connection over a wired telephone line.

Using the modem 202, the base station 124 may be configured to communicate with a remote server 206 and/or with the user's mobile device 208. As one example, the base station 124 may be in communication with the remote server 206, such that the base station 124 may be configured to indicate to the remote server 206 the presence of the key fob 110. Such a system may be useful in remote monitoring of the location of the key fob 110.

As a further example, the base station 124 may be further configured to provide for remote access to the vehicle 102 using the mobile device 208 using the key fob 110 detected as being located at the base station 124. The mobile device 208 may be any of various types of portable computing device, such as a cellular phone, tablet computer, smart watch, laptop computer, portable music player, or other device having a device modem 210 capable of communication with the base station 124 over the wide-area network 204. The mobile device 208 may also be configured to communicate with the vehicle 102 over the wide-area network 204 using the device modem 210, or over a local-area connection with the vehicle 102 using a wireless transceiver 212 (e.g., a BLUETOOTH module, a ZIGBEE transceiver, a Wi-Fi transceiver, an IrDA transceiver, an RFID transceiver, etc.).

The mobile device 208 may include one or more processors 214 configured to execute instructions of applications (e.g., an access application 216) loaded to a memory 218 of the mobile device 208 from storage medium 220 of the mobile device 208. In some examples, the mobile applications may be configured to communicate with the controller 104 or other locally-networked devices and with the wide-area network 204.

The user may utilize the access application 216 to cause the mobile device 208 to request access to the vehicle 102. Accordingly, the access application 216 may direct the mobile device 208 to access the base station 124 over the wide-area network 204. In other cases, the access application 216 may be configured to access the remote server 206 to retrieve address information and/or access credentials to use to access the base station 124. In still other cases, the access application 216 may be configured to access the remote server 206, and the remote server 206 may be configured to send the access request to the base station 124 and forward any response from the base station 124 to the mobile device 208.

Regardless of approach, the base station 124 may receive the access request. If the key fob 110 is not present at the base station 124, the base station 124 may indicate a failure, and may send a response message indicating that the key fob 110 is unavailable to process the access request. If the key fob 110 is present, the base station 124 may be configured to utilize the key fob 110 to respond to the request. In an example, the base station 124 may construct a LF challenge based on information included in the access request, temporarily discontinue the interference signal 132, send the LF challenge request using the base transceiver 126, receive a UHF response from the key fob 110, resume the interference signal 132, and send a response message over the wide-area network 204 including information from the UHF response. The response may be addressed to the mobile device 208 in examples in which the mobile device 208 communicates with the base station 124 or to the remote server 206 in examples in which the mobile device 208 communicates with the base station 124 via the remote server 206. Using the information in the response, the mobile device 208 may communicate with the vehicle 102 to gain access to the vehicle 102.

In a more specific example, the access application 216 may display an interface mimicking that of a key fob 110. For instance, the interface may include lock, unlock, remote start, and trunk release buttons corresponding to the one or more fob controls 118 of the key fob 110. Responsive to user selection of one of the virtual key fob controls 118, the access application 216 may send a request including the requested action to the base station 124, and may receive a response from the base station 124. Using the response, the access application 216 may send a request using the wireless transceiver 212 or the device modem 210 to the vehicle 102 to perform the user-selected action. The vehicle 102 may accordingly authenticate the mobile device 208 as authorized to perform the action based on the information received by the mobile device 208 from the key fob 110. Further aspects of a base station 124 configured to provide for vehicle 102 access are described in detail in U.S. patent application Ser. No. 14/461,848, titled "Method and System for a Key Fob Base Station Enabling Remote Car Access using a Nomadic Device," which is incorporated herein by reference in its entirety.

Figure 3:
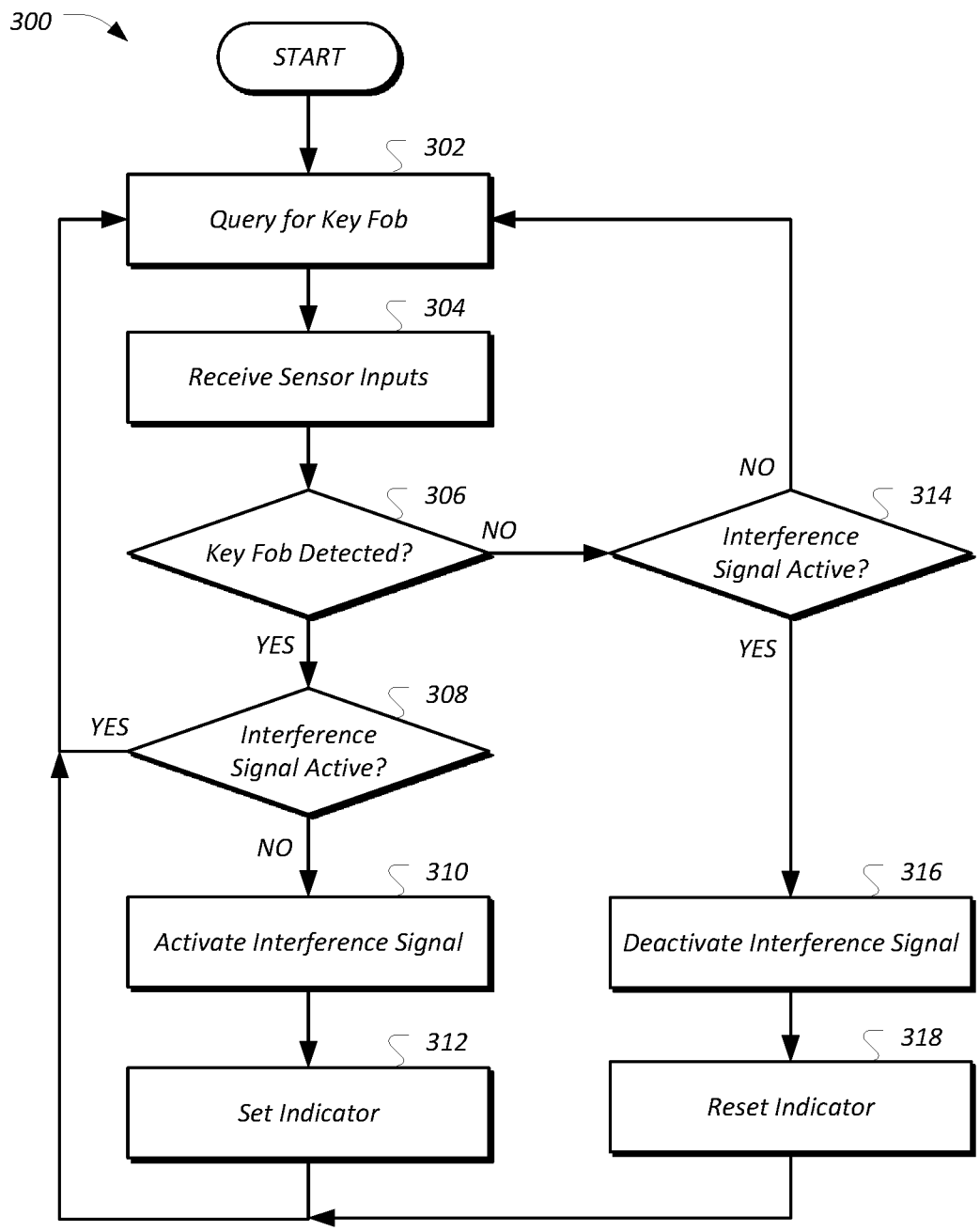
FIG. 3 illustrates an example process for securing the key fob of the keyless entry vehicle using the base station.

FIG. 3 illustrates an example process 300 for securing the key fob 110 of the keyless entry vehicle 102 using the base station 124. The process 300 may begin at operation 302, in which the base station 124 queries for the key fob 110. In an example, the base station processor 128 directs the base transceiver 126 to periodically transmit a dummy LF challenge request, such that if the base transceiver 126 receives a UHF response message, the base station processor 128 may receive the UHF response message and determine presence of the key fob 110. In other examples, if the key fob 110 is already confirmed as being present, the base station processor 128 may only direct the base transceiver 126 to transmit the LF challenge request if input from the presence detectors 130 (such as change in weight or flux) indicates possible removal of the key fob 110.

At operation 304, the base station 124 receives sensor inputs. In an example, the base station 124 receives input from the base transceiver 126, such as the UHF response message to the dummy LF challenge. In another example, the base station processor 128 receives input from the weight sensor presence detector 130 configured to provide input to the base station processor 128 indicative of a measure of weight of placed on the base station 124. In yet a further example, the base station processor 128 receives input an induction coil included in the base station 124 configured to provide input to the base station processor 128 indicative of a measure of electromagnetic flux in the vicinity of the base station 124.

At operation 306, the base station 124 determines whether a key fob 110 is detected. In an example, the base station processor 128 may determine that the key fob 110 is present if one or more of the inputs indicate presence of the key fob 110. In another example, the base station processor 128 may determine that the key fob 110 is present only if the input from the base transceiver 126, and also input from one or more presence detectors 130, confirms the presence of the key fob 110. If the base station 124 determines the key fob 110 to be present, control passes to operation 308. Otherwise, control passes to operation 314.

At operation 308, the base station 124 determines whether the interference signal 132 is active. In an example, the base station processor 128 may query an indictor bit or other memory of the base station 124 (not shown) to identify whether the interference signal 132 is currently active. If so, no further action is required, and control passes back to operation 302. If not, control passes to operation 310.

At operation 310, the base station 124 activates the interference signal 132. In an example, the base station processor 128 may direct the base transceiver 126 to broadcast a low-level LF interference signal 132. In an example, the interference signal 132 may be a noise signal, such as white noise or pink noise, which is strong enough to prevent the key fob 110 from correctly receiving LF challenge requests from the vehicle 102 or from a LF amplifier device, but weak enough not to cause undesirable interference. The interference signal 132 may accordingly block the key fob 110 from receiving LF challenges, thereby thwarting LF challenge amplifier attacks.

At operation 312, the base station 124 sets the indicator 134 to indicate that the interference signal 132 is activated. In an example, the base station processor 128 may set the indictor bit or other memory to identify that the interference signal 132 is currently active. Responsive to setting of the indicator bit or responsive to further command from the base station processor 128, one or more indicators 134 may be activated to inform the user that the interference signal 132 has been activated. In an example, the activation may include one or more of directing a light indicator 134 to be adjusted in brightness and/or color, directing a speaker indicator 134 to produce a sound, and updating a displays screen of the base station 124 to indicate that the interference signal 132 is invoked. After operation 312, control passes to operation 302.

At operation 314, the base station 124 determines whether the interference signal 132 is active. The determination may be performed similar to as discussed above with respect to operation 308. If the interference signal 132 is active, control passes to operation 316. If not, no further action is required and control passes back to operation 302.

At operation 316, the base station deactivates the interference signal 132. In an example, the base station processor 128 may discontinue directing the base transceiver 126 to broadcast the low-level LF interference signal 132 (or may direct the base transceiver 126 to discontinue the broadcast).

At operation 318, the base station 124 sets the indicator 134 to indicate that the interference signal 132 is deactivated. In an example, the base station processor 128 may reset the indictor bit or other memory to identify that the interference signal 132 is currently inactive. Responsive to setting of the indicator bit or responsive to further command from the base station processor 128, one or more indicators 134 may be adjusted or deactivated to inform the user that the interference signal 132 has been deactivated. In an example, the deactivation may include one or more of directing a light indicator 134 to be adjusted in brightness and/or color, directing a speaker indicator 134 to produce a sound indicating discontinuation of the interference signal 132 or discontinuing producing sound provided while the interference signal 132 is active, and updating a displays screen of the base station 124 to indicate that the interference signal 132 is disengaged. After operation 318, control passes to operation 302.

Figure 4:
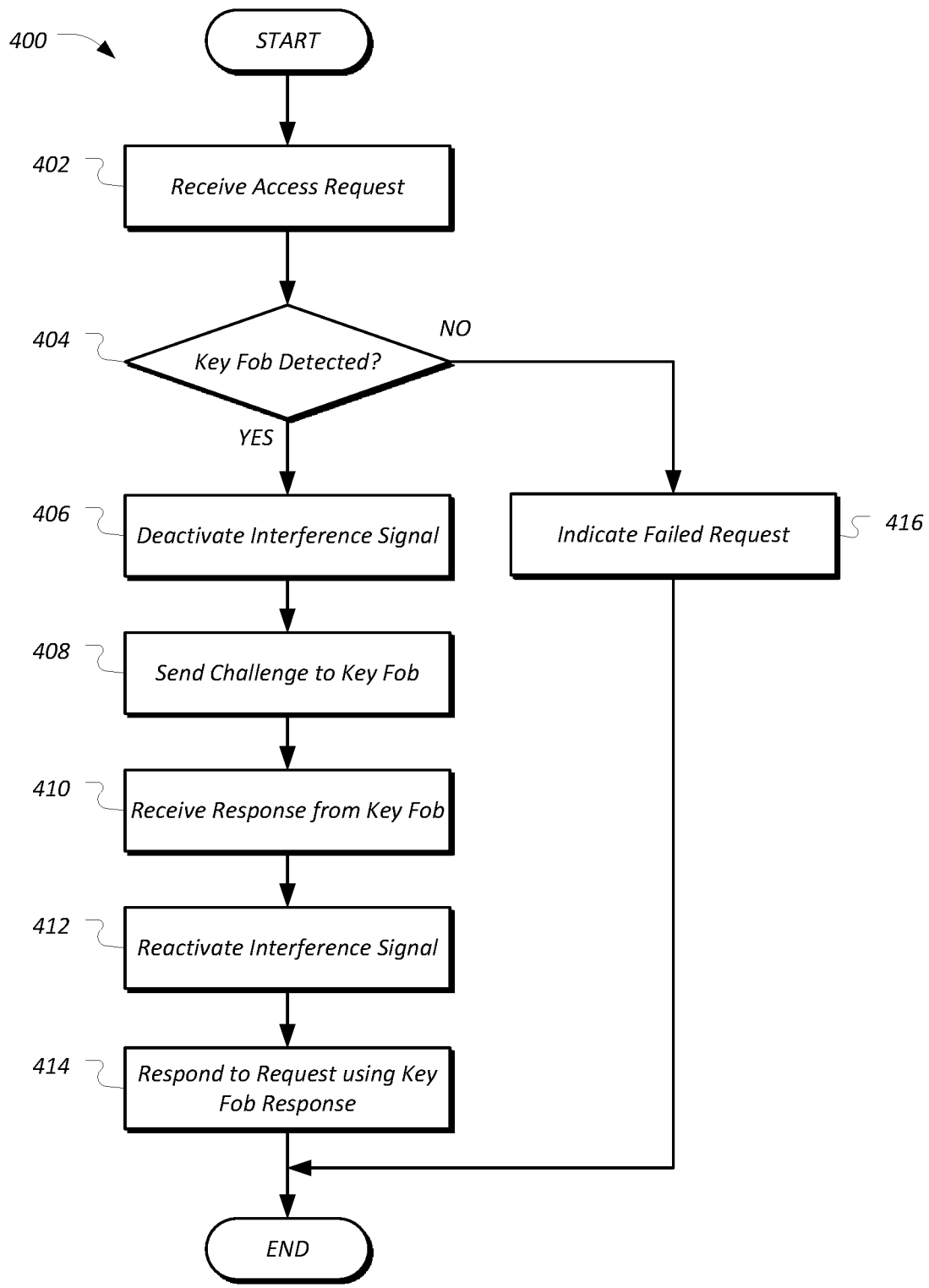
FIG. 4 illustrates an example process for using the base station having network connectivity for performing key fob authentication using the mobile device.

FIG. 4 illustrates an example process 400 for using the base station 124 having network connectivity for performing key fob 110 authentication using the mobile device 208. In an example, the process 400 may be performed by the network-enabled base station 124 shown in the system 200 connected to the wide-area network 204.

At operation 402, the base station 124 receives an access request. In an example, the base station 124 receives the access request via the station modem 202 connection to the wide-area network 204 from the mobile device 208. In another example, the base station 124 receives the access request from the remote server 206, where the remote server 206 is in communication with the mobile device 208.

At operation 404, the base station 124 determines whether the key fob 110 is detected. In an example, the base station processor 128 may query the indictor bit or other memory of the base station 124 to identify whether the interference signal 132 is currently active for a detected key fob 110. If so, control passes to operation 406. Otherwise, control passes to operation 416.

At operation 406, the base station 124 temporarily deactivates the interference signal 132. In an example, the base station processor 128 deactivates the interference signal 132 similar to as discussed above with respect to operation 316 of the process 300.

At operation 408, the base station 124 sends a challenge request to the key fob 110. In an example, the base station processor 128 may construct a LF challenge based on the access request. For instance, if the user selected an unlock virtual key fob control 118 of the access application 216, the access request may indicate an unlock command, and the LF challenge may specify the request to unlock. The base station processor 128 may send the LF challenge to the key fob 110 using the base transceiver 126.

At operation 410, the base station 124 receives a challenge response from the key fob 110. In an example, base station processor 128 may receive the UHF response from the key fob 110 using the base transceiver 126. The response may include information to be forwarded in response to the access request.

At operation 412, the base station 124 reactivates the interference signal 132. In an example, the base station processor 128 reactivates the interference signal 132 similar to as discussed above with respect to operation 310 of the process 300.

At operation 414, the base station 124 responds to the access request using information from the challenge response. In an example, the base station 124 constructs a response to the access request including information received in the UHF response, and sends the response back to the origin of the access request. After operation 414, the process 400 ends.

At operation 416, the base station 124 responds to the access request with an indication of failure of the request. In an example, the base station 124 constructs a response to the access request indicated that no key fob 018 is present at the base station 124, and sends the response back to the origin of the access request. After operation 416, the process 400 ends.

The above description of process 400 relates to a scenario in which each virtual fob command initiated on the mobile device 208 results in a one-for-one request networked to the base station 124 to make a one-for-one request of the key fob 110. An alternate approach may be to transfer full virtual key rights to the device 208 as long as key fob 110 remains on the base station 124. A phone, tablet or other nomadic consumer electronic device (e.g., mobile device 208) would become the key fob 110, or one of a group of key fobs 110, with full rights to access, control, and start a vehicle 102 equipped with BLUETOOTH Low Energy (BLE) Phone-as-a-Key technology provided one of the approved key fobs 110 for vehicle 102 remain on the base station 124.

In the same way that a PEPS key fob 110 may be susceptible to a man-in-the-middle (MITM) attack, a mobile device 208 granted virtual key status may also be spoofed with MITM methodologies. As an example, one member of a MITM team could be at the skin of vehicle 102 with a BLE transceiver used to relay signals to a second MITM team member near the mobile device 208 operating with the approved virtual key mirror of key fob 110. Therefore, when the key fob 110 is on the base station 124, and there are active mobile device 208 virtual keys, placement of these same virtual key devices 208 near or on the base station 124 should result in these key fobs 110 suspending transmission of valid passive entry or passive start BLE signals if devices 208 are queried by vehicle 102.

As another possibility, when the base station 124 detects the presence of a key fob 110, if the base station 124 detects the transmission of a challenge request using the base transceiver 126, the base station 124 may respond to the challenge request with a properly-formatted challenge response using random or otherwise invalid information in place of a secret key or other information. In such an example, a MITM attacker may be able to detect transmissions that appear to be from the key fob 110, but that will be ineffective in controlling the vehicle 102.

As yet a further possibility, a base-station-aware key fob 110 may be programmed to be aware of the presence of the base station 124. In an example, the key fob 110 may receive a command from the base station 124 configured to notify the key fob 110 to stop responding to the challenges requests until certain criteria are met. These criteria may include one or more of a timeout of predetermined period of time, until the base station 124 issues a command to re-enable responses to challenge requests, or another event such as the user physically pressing a button on the key fob 110.

Computing devices, such as the base station 124, remote server 206, and mobile device 208, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by the base station processor 128 or a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed is:

1. A system comprising:
   a base station, including a transceiver, an indicator, and a processor, programmed to
   detect presence of a key fob using one or more inputs from a presence sensor, and
   responsive to the key fob being detected, broadcast an interference signal using the transceiver to prevent the key fob from detecting challenge requests and set the indicator to indicate presence of the broadcast of the interference signal.

2. The system of claim 1, wherein the processor is further programmed to discontinue the broadcast of the interference signal and reset the indicator to no longer indicate presence of the broadcast responsive to the key fob no longer being detected by the presence sensor.

3. The system of claim 1, wherein one or more of: (i) the indicator includes a light or display, and to set the indicator includes to activate the light or display, and (ii) the indicator includes a speaker, and to set the indicator includes to play a sound through the speaker.

4. The system of claim 1, wherein the processor is further programmed to periodically send key fob challenge requests using the transceiver, and the one or more inputs include an input from the transceiver indicative of a key fob challenge response from the key fob.

5. The system of claim 1, where the presence sensor includes one or more of a weight sensor providing a signal indicative of presence of an object placed on the base station, an inductive charging coil providing signal indicative of electromagnetic presence of the key fob at the base station, a capacitive sensor providing a signal indicative of capacitive presence of the key fob, an optical sensor providing signal indicative of a visual presence of the key fob, and a near field communication (NFC) tag providing NFC communications indicative of presence of the key fob.

6. The system of claim 5, wherein the one or more inputs include input from at least two presence sensors of different types.

7. The system of claim 6, wherein the processor is further programmed to, responsive to electromagnetic presence of the key fob being detected using an inductive charging coil, activate inductive charging of the key fob using the inductive charging coil.

8. The system of claim 1, wherein the interference signal includes noise broadcast over one or more of a 125 kilohertz (kHz) frequency band or a 134.5 kHz frequency band.

9. The system of claim 1, wherein the interference signal includes an Amplitude Key Shift (ASK) signal with one of alternating bits, all one bits, or random bits.

10. The system of claim 1, wherein the base station further includes a modem configured to communicate over a wide-area network, and the processor is further programmed to:
    receive an access request to access the key fob from the modem,
    temporarily discontinue the broadcast of the interference signal,
    send a challenge request to the key fob using the transceiver,
    receive a challenge response to the challenge request using the transceiver,
    resume the broadcast of the interference signal, and
    send a response to the access request including information based on the challenge response.

11. A method comprising:
    detecting presence of a key fob via a presence sensor;
    in response to the key fob being detected, broadcasting an interference signal using a transceiver to inhibit the key fob from responding to challenge requests, and displaying an indicator to indicate presence of the broadcast; and
    responsive to the key fob no longer being detected, discontinuing the broadcast of the interference signal and resetting the indicator to no longer display presence of the broadcast.

12. The method of claim 11, further comprising:
    receiving an access request to access the key fob from a modem;
    temporarily discontinuing the interference signal to send a challenge request to the key fob and receive a challenge response; and
    send a response to the access request including information based on the challenge response.

13. The method of claim 11, further comprising, in response to the key fob being detected, sending the fob a command to suspend ultra-high-frequency (UHF) responses from the key fob.

14. The method of claim 11, further comprising displaying the indicator by adjusting one or more of brightness and color of a light to indicate presence of the broadcast.

15. The method of claim 11, further comprising periodically sending key fob challenge requests to confirm the presence of the key fob.

16. The method of claim 11, further comprising confirming the presence of the key fob using one or more of a weight sensor and an inductive charging coil.

17. The method of claim 16, further comprising sending a key fob challenge request to confirm the presence of the key fob responsive to a change in presence identified using one or more presence detectors.

18. The method of claim 11, wherein displaying the indicator includes displaying an indication of a frequency over which the interference signal is broadcast.

19. The method of claim 11, wherein the interference signal includes an Amplitude Key Shift (ASK) signal with one of alternating bits, all one bits, or random bits broadcast over one or more of a 125 kilohertz (kHz) frequency band or a 134.5 kHz frequency band.

20. A system comprising:
a transceiver for communication with a key fob;
a presence sensor configured to provide a signal indicative of presence of the key fob;
a modem; and
a processor, in communication with the transceiver and modem, programmed to
receive a request to access the key fob from the modem,
detect presence of the key fob,
using the transceiver, temporarily discontinue broadcast of an interference signal to send a challenge request to the key fob and receive a challenge response, and
send a response to the request including information based on the challenge response.

21. The system of claim 20, wherein the processor is further programmed to
during when the key fob is detected, broadcast the interference signal using the transceiver to prevent the key fob from responding to challenge requests.

22. The system of claim 21, further comprising an indicator, wherein the processor is further programmed to:
during when the key fob is detected, set the indicator to indicate presence of the broadcast; and
during when the key fob is not detected, set the indicator to indicate lack of presence of the broadcast.

23. The system of claim 20, wherein the request is sent from a mobile device, and the response to the request provides access rights of the key fob to the mobile device.

* * * * *